(12) United States Patent
Protheroe et al.

(10) Patent No.: US 6,414,686 B1
(45) Date of Patent: Jul. 2, 2002

(54) MULTIMEDIA EDITING AND COMPOSITION SYSTEM HAVING TEMPORAL DISPLAY

(75) Inventors: Simon Protheroe, London; Symon Hammacott, Arundel, both of (GB)

(73) Assignee: Eidos plc (GB)

( * ) Notice: Subject to any disclaimer, the term of this patent is extended or adjusted under 35 U.S.C. 154(b) by 0 days.

(21) Appl. No.: 09/281,844

(22) Filed: Mar. 31, 1999

(30) Foreign Application Priority Data

Dec. 1, 1998 (GB) .............................................. 9826393

(51) Int. Cl.[7] .............................................. G06T 15/70
(52) U.S. Cl. ........................ 345/474; 345/475; 345/723; 345/726; 345/967; 345/729
(58) Field of Search ................................ 345/328, 118, 345/723, 474, 302, 473, 475, 726, 729, 987, 704; 700/500.1

(56) References Cited

U.S. PATENT DOCUMENTS

| | | | |
|---|---|---|---|
| 5,339,393 A | 8/1994 | Duffy et al. | 395/161 |
| 5,359,712 A * | 10/1994 | Cohen et al. | 345/328 |
| 5,388,197 A | 2/1995 | Rayner | 395/154 |
| 5,404,316 A | 4/1995 | Klingler et al. | 364/514 |
| 5,442,744 A | 8/1995 | Piech et al. | 395/154 |
| 5,513,306 A | 4/1996 | Mills et al. | 395/148 |
| 5,519,828 A | 5/1996 | Rayner | 395/161 |
| 5,659,790 A | 8/1997 | Kim et al. | 395/806 |
| 5,689,287 A | 11/1997 | Mackinlay et al. | 345/427 |
| 5,732,184 A | 3/1998 | Chao et al. | 386/55 |
| 5,781,188 A | 7/1998 | Amiot et al. | 345/328 |
| 5,786,814 A | 7/1998 | Moran et al. | 345/328 |
| 5,892,507 A * | 4/1999 | Moorby et al. | 345/302 |
| 5,999,173 A * | 12/1999 | Ubillos | 345/328 |

FOREIGN PATENT DOCUMENTS

| | | |
|---|---|---|
| EP | 0 843 311 A2 | 5/1998 |
| WO | 98/18091 | 4/1998 |

* cited by examiner

Primary Examiner—Mark Zimmerman
Assistant Examiner—Kimbinh T. Nguyen
(74) Attorney, Agent, or Firm—Testa, Hurwitz & Thibeault LLP

(57) ABSTRACT

A video editing system in which source clips are added to a composed video sequence by addition to a curved time line which displays the entire temporal arrangement of the program elements. Editing is carried out in a region of high temporal resolution for maximum accuracy.

18 Claims, 8 Drawing Sheets

MULTIMEDIA EDITING AND COMPOSITION SYSTEM HAVING TEMPORAL DISPLAY

TECHNICAL FIELD

The invention relates to multimedia editing systems and more particularly computer based systems for composing and editing video and audio sequences comprising a plurality of components.

BACKGROUND TO THE INVENTION

Computer based systems for composing and editing combined audio and video sequences are known. Recent systems accept input signals representing components, which are often called clips, and which are combined into an audio and video output sequence. The input signals are usually of several different types including audio, still images, video images, text and computer generated images. Computer generated images include still images and video sequences.

Video images can be captured from a video camera or may actually be composed by a system such as the system described in this invention. Still images may also be captured by a camera or may be digitised by a scanner from a photograph or print. All such signals are usually stored on an optical or magnetic medium, referred to as the source medium, in analogue or digital form. Analogue signals will be digitised before they are used as inputs to a composition and editing system. The input types described here are sometimes referred to as multimedia content and the possible input types are not restricted to the those described above.

The methods of digitising a still image which is either a real scene or a reproduction of a real scene, by raster scanning, are well known, particularly in relation to digital photography and printing. The methods of reproducing moving scenes by first electronically capturing a series of essentially still images, known as frames, are also well known, particularly in relation to television.

The computer used in this system may be a special purpose design or be of the type commonly known as a desk top machine such as a PC. It will include a central processing unit, memory for storage, a display system and user input controls. The types of user input controls which may be used include both common computer input devices, for example, a keyboard, mouse, tracker ball or joystick and editing devices specific to the video editing industry such as a jog shuttle wheel or audio mixing desk.

An operator who is working at the computer to assemble a presentation from portions of the available input clips requires simultaneous information about the input clips as well as information about the presentation defined so far in his work. In addition to this information the operator requires access to tools which define how the clips are to be included in the presentation. It is usual to display the various information and tools to the operator using an operator interface based on a windowing system. Such windowing systems are well known in personal computing systems.

Information about the individual input clips may be displayed in a window and may include a small image, sometimes called a thumbnail, which represents the first frame of a video sequence. Additional information regarding the type of content and duration is required. A means within the display is also provided for viewing or listening to the content of an individual clip and then selecting a portion to be used in the final presentation. Normally the portion initially selected is only approximately defined and a portion longer than needed for the final presentation will be selected. This process is called an assemble edit or rough cut.

The individual clips which have been rough cut may be modified and combined with other clips in order to achieve different visual and audio effects. The simplest of these is known as a cut and results in the frames of the final presentation consisting of the frames from a first clip immediately followed by the frames of a second clip. More complex transitions are common in which the last frames of the first clip are overlapped with the first frames of the second clip such that the first sequence gradually changes to the second sequence over a period of time. The effects in such transitions are usually selected from a library of possible transition types. In more complex presentations there may be two or more video and audio sequences combined for a period of time to achieve an artistic effect.

Other special effects for modifying or combining clips or adding titles or adding still images or adding animated images, etc. are well known.

It is common practice to provide, on a display, a type of window known as a time line to represent the sequence of the various clips and transitions which combine to form the final presentation. The time line displays used in current systems typically consist of a series of parallel rectangular elements, known as time bars, shown on the computer display. Horizontal distance across the time bars is usually used to represent time with the time bars arranged vertically. Time is normally represented linearly with distance.

During the editing process, the operator may define a number of tracks which may be video, audio or other media types. Each track will be defined on a time bar of the time line. These tracks are a well known concept in both video and audio editing and are used to control the composition of one or more source clips which may be used simultaneously to form part of a composed sequence. They are necessary when two or more source elements are present at one point in time in the output sequence, for example when audio and video are concurrent or during a special transition effect from one source clip to another.

Rough cut clips and transitions are added to the time line as the presentation is built up in order to control the final presentation and provide the operator with a diagrammatic representation of the content of the presentation. Each rough cut clip is adjusted by the operator to have start and ending points which are precisely defined with respect to the source media containing the clip and also precisely defined with respect to the final presentation. This process of precisely defining the clip is known as trimming. Several methods of trimming to achieve a desired programme effect are known.

Time can be measured in units of hours, minutes and seconds and frames. The addition of frame units is provided to allow the operator to achieve precise control of which frames are used in the presentation and to control their time relationship with the frames of other clips, transitions and special effects. Whereas hours minutes and seconds are common and precisely defined time units, frame units vary depending on the particular standard used in the target presentation. Typically they may be one thirtieth of a second or one twenty-fifth of a second. Time measured in hours minutes seconds and frames from the start of the source medium containing a clip, or a composed programme, is known as a time code.

As mentioned earlier, there is usually a means for displaying the source clips. It is also necessary to provide a means for viewing the presentation as it is built up whilst the operator works. These two requirements are often satisfied by providing two video display areas which are side by side in a single window. It is necessary to provide user controls to play the selected video clip or final composed presentation. Such controls may be provided to start or stop the video. Additionally controls are usually provided, in the form of sliders adjacent to the video display areas, which may be used to move forwards or backwards through video at a rate determined by the operator.

A similar facility is also provided for moving through the composed programme in the presentation display window by sliding a pointer on the time line. The presentation display slider and the viewing window slider can be synchronised to each other. Additionally a display of the slider position, and hence the displayed frame position, may be given by a time code display. When using the normal video or audio play controls, the video frames will be played at a rate appropriate for the standard chosen for the presentation or clip. Moving the time slider to play backwards and forwards through a sequence is known as scrubbing.

It will be appreciated that a computer display is limited in size and resolution and consequently the amount of information which can be displayed along a time line is limited. A typical display may be have a width of 300 mm which consists of 1024 pixels. During some editing operations an operator may wish to work on the time line with a display of the overall presentation, which may last more than one hour. In another operation the operator may wish to work on a sequence of individual frames which form a selected transition or special effect. It is not previously possible to provide a single time line which allows frame by frame viewing of the sequence at the same time as viewing the whole presentation. Current systems require that the scale of the time line is changed to suit the operation currently being performed.

The smallest scale must allow individual frames to be identified and the largest scale should provide a view, for example, of up to three hours across the whole display screen. In order to provide the operator with this range of time line views it may be necessary to provide up to 15 different scales for the time line ranging from a few frames per time line division up to several minutes per division.

It is difficult for the operator to choose which scale to use without using a trial and error process. When a scale is first selected the portion of the presentation of interest will often not be in view and it is necessary to scroll along the window in order to find the required portion. Having found the required portion it may then become apparent that the scale selected is not optimum for the desired operation. In this case yet another time scale selection must be made and the process repeated.

This is a disadvantage of this method of displaying and selecting time line information.

It will be appreciated that the time line window contains a number of different types of information about a section of the composed programme. The amount of detail which can be shown for each clip or transition depends upon the timescale chosen and the size of display available. The operator will continually be changing the timescale and position of the time line during editing and composing the programme. This results in repeated step changes in the scale of information provided. These characteristics of the time line type of operator interface cause operator confusion. The operator is presented with too much information in windows whose composition is continuously changing as a result of scale changes or scrubbing operations.

SUMMARY OF THE INVENTION

It is an object of the present invention to provide a time line system with improved usability, which does not require repeated time consuming changes of scale of the time line and which provides improved clarity of information presented to an operator.

According to the present invention, there is provided a system for editing together media segments using data processing means, in which there is provided a visual representation of a time line along which are arranged a plurality of elements representative of the media segments. There is a primary region in which the displayed linear extent per unit time is a maximum, and secondary regions to either side of the primary region in which the displayed linear extent per unit time is less than in the primary region. Means are provided whereby an element in a secondary region may be moved into the primary region.

In a preferred system there is a gradual decrease in the linear extent per unit time, i.e. temporal resolution on the display, from the primary region outwards. In one preferred arrangement the visual representation is provided with a perspective effect, seeming to curve away from a viewer. The height of the visual representation may decrease from the primary region outwards as a result of the perspective effect.

In the operation of such a system, a user can select an element which is outside the primary region and move it towards the primary region. As this happens, the element will lengthen, thus increasing the temporal resolution as it is moved towards an area where editing will take place. Preferably the arrangement is such that an element can be scrolled relatively smoothly along the time line, lengthening and shortening as it moves towards or away from the primary region.

Thus, it is possible to have access to a number of elements on the time line, whilst being able to carry out operations on selected elements whilst they are displayed at a suitably high temporal resolution. Where there is a gradual change in temporal resolution, which may be continuous or stepwise, it may not be necessary to move an element into the primary region of maximum resolution for editing to take place and there may be an adjacent region of suitably high temporal resolution.

In one preferred arrangement there is provided a supplementary display of information relating to a media segment which is represented by an element, and this may be activated when the element is selected. Selection of the element for the purpose of the supplementary display can preferably take place at any point along the time line and may be effected merely by placing a pointer over the element.

Thus a sequence on a time line can be displayed in a representation which both allows the whole sequence to be represented and which also allows fine control of editing without the need to switch time scaling of the time line during editing and composition operations. The preferred supplementary display, in conjunction with the time line, provides an improved operator interface.

Other objects and advantages of the present invention will become apparent from the following description of preferred embodiments taken in conjunction with the accompanying drawings.

DETAILED DESCRIPTION OF THE PREFERRED EMBODIMENTS

Figure 1:
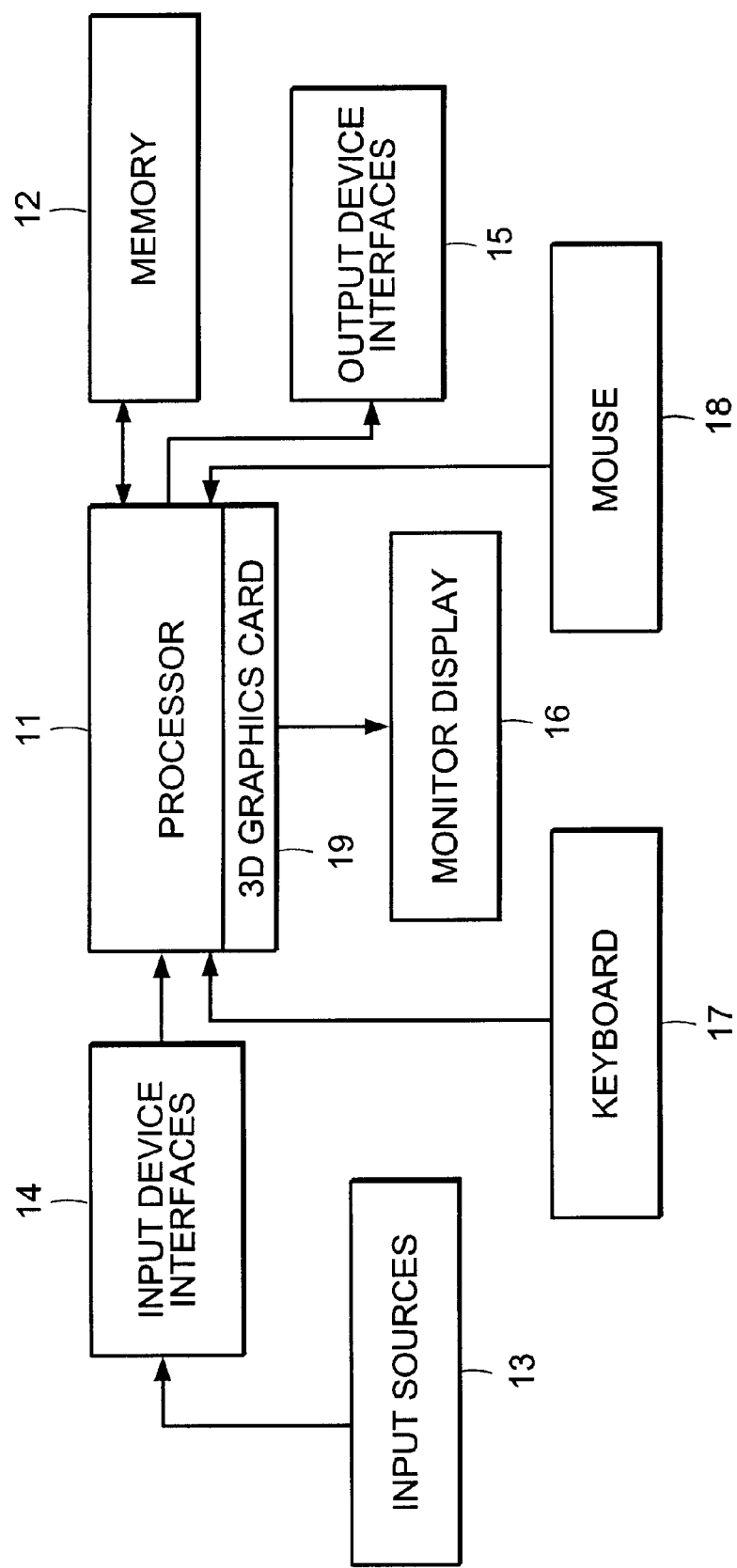
FIG. 1 is a diagram of an editing system substantially according to the current invention.

FIG. 1 is a block diagram of a multimedia composing and editing system in accordance with the present invention. The composing and editing system includes a processor 11, (such as an Intel Pentium II). The processor has associated memory 12, which comprises RAM (random access memory) and mass storage memory including both hard and floppy disc. Source data, 13, representing input Video, audio or other multimedia clips which is captured from a camera or scanner or stored on magnetic or optical media is input to the processor via the input device interface, 14. The final composed programme is output via output interface, 15, to a storage or display device (not shown). Preferably the processor 11 includes a three dimensional graphics accelerator electronic circuit board, 19, in order to provide adequate interactive speed performance to the operator.

A keyboard, 17, and mouse, 18, are provided to enable the operator to control both the general operation of the computer operating system and the software program used for the composing and editing process. A display, 16, provides the operator with information from the operating system as well as the composing and editing software program. The keyboard, mouse and display provide an interactive system for the operator.

The memory is used to store an operating system, such as windows NT, and a software application program, for carrying out the composing and editing operations. The application software includes a time line display method according to the current invention. In all other respects the software performs the editing and composition operations of the type described above. The software program may also use the memory for temporary storage of sections of multimedia source clips or sections of the composed programme while the editing and composing sequence is being carried out.

It will be appreciated that the editorial features may vary from time to time or vary between systems from different manufacturers. The time line display system described in this invention may be used in any application requiring detailed temporal information.

Figure 2:
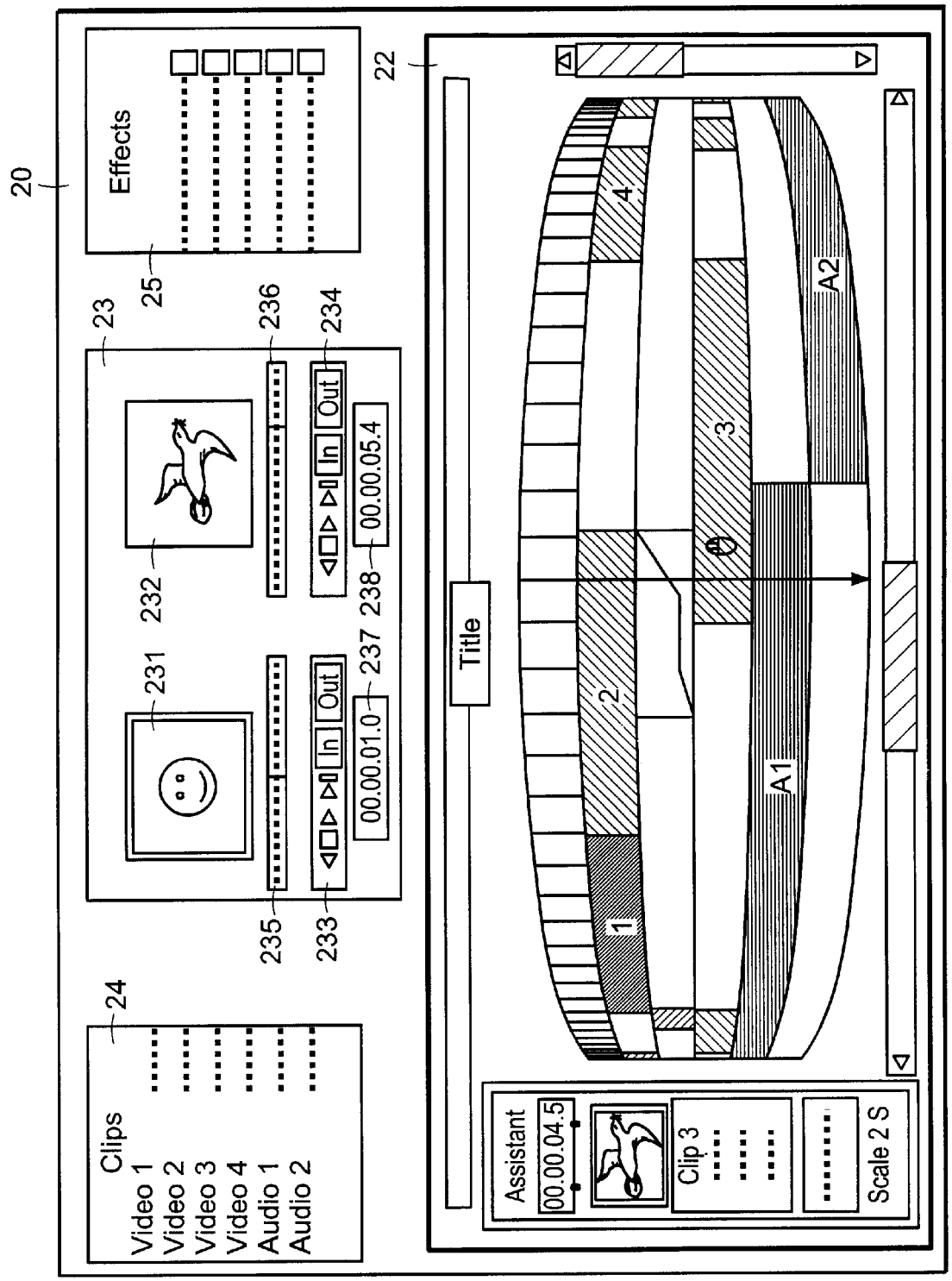
FIG. 2 shows elements of an editing screen display according to the invention.

Referring to FIG. 2, a portion, 20, of the computer system display is used for the video editing application. A window, 23, displays a frame, 231, of a selected source clip and a frame, 232, of the composed programme. A set of controls, 233, is provided to scrub, through and control the selected source clip. A small time line slider, 235, is provided to scrub through the selected source clip and a display element, 237, is provided to show the time code of the currently displayed frame of the source clip. Controls 233 also include functions labelled "IN" and "OUT" which are used to rough cut the clip to be used in the composed programme. A set of controls, 234, is provided to play through the composed sequence and a small time line slider, 236, is provided to scrub through the composed sequence and a display element, 238, shows the time code of the currently displayed frame from the composed sequence. A time line display window, 22, is provided and shown annotated in FIG. 3. A window, 24, provides information on the clips which have been selected for inclusion in the composed sequence.

A window, 25, provides a list of the available special effects. Windows 24 and 25 are shown as examples of other types of window which may be displayed and they may be hidden or displayed according to operator requirements. Further windows for other control operations, for example selection and definition of transitions, may also be provided to assist the operator but are not important to the current invention.

The time line, 22, will now be described with reference to FIG. 3 which shows a time line window, 32, according to the current invention. The time line displays a graphical representation of the temporal relationship of individual source clips which are combined to form the composed sequence.

A composed programme is built up by dragging rough cut source clips onto one of the tracks, 361 to 363, of the time line from the windows 24 or 231 in FIG. 2, using the mouse.

Figure 3:
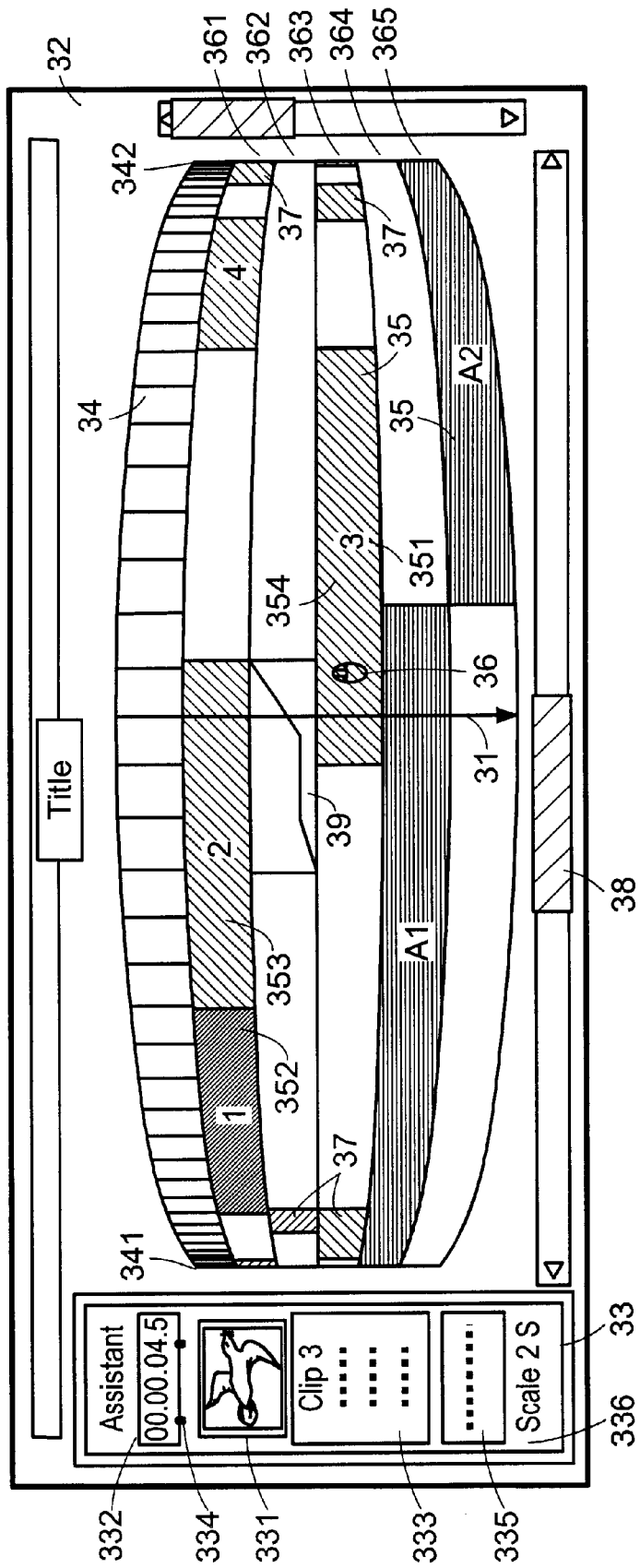
FIG. 3 shows detail of a time line according to the invention.

FIG. 3 shows, by way of example, video tracks 361 and 363 used with transition track 362 and audio tracks 364 and 365. Clips, 35, are shown as shaded on the tracks and are identified by a simple reference number, 351.

Video track, 361, is shown containing video clip 1, 352, and video clip 2, 353. Video track 363, contains video clip 3, 354. Video transition track, 362, is shown containing a gradual transition, 39, from video clip 2 to video clip 3. Audio tracks 364 and 365 are shown containing audio clips A1 and A2 respectively. The change from video clip 1, 352, to video clip 2, 353, is shown as a cut with no transition.

Precise trimming of the rough cut clips on the time line is accomplished by means which are well known in prior art. A means is provided so that a clip is moved along the time line by placing the mouse over the clip on the time line, pressing the mouse button and dragging the mouse so that the clip moves along the time line. The clip length is altered by placing the mouse over the start of the clip on the time line, pressing the mouse button and dragging left or right so that the clip remains fixed on the time line but its start point moves. Moving the mouse left causes an earlier start point, and hence longer clip, to be defined and moving the mouse right causes a later start point, and hence a shorter clip, to be defined. Similarly, placing the mouse over the end of the clip, pressing the mouse button and dragging left or right causes the end point to be earlier or later. This trimming operation is carried out near the centre of the time line where maximum temporal resolution is obtained and where frame accuracy may be to a single frame.

Centerline, 31, provides a current reference point in time for the display. The tracks 361 to 365 are curved and displayed in a perspective view so that the entire length of the programme can be visualised along the time line from the program start at 341 to the programme end at 342. The timescale, 34, shows equal intervals of time along the curved tracks. Because of the perspective view of the curved tracks, the uniform time marks appear to get closer as the time axis approaches the edges of the time line display. It is most convenient to conceptually visualise the display as perspective view of a three dimensional time surface which will be described in detail later.

The perspective view of the tracks causes source clips, 37, which are not relevant to the current editing operation to be compressed in space towards the extremities of the time line display. This has the advantage that the transition currently being defined, or edited, is shown clearly to allow time precision of the edit whilst allowing all of the programme to be visualised.

The pixel resolution of the display limits the amount of detail which can be seen towards the extremities of the programme, however the ability of the time line to represent the whole sequence is a significant aspect of the current invention. The significance of the complete view of the time line will become apparent when the dynamic aspects of the system are considered later in this description.

A feature of the invention is the improved information content and display format which is presented to the operator. This aspect will now be described in more detail. All fixed information such as clip name and sample frames, which is placed on the time line in prior art, is removed from the time line. The operator may display information about a clip by moving the mouse pointer, 36, over the clip. A time line assistant window 33 displays information concerning the clip which is currently under the mouse pointer, 36. As the mouse pointer is moved along a clip, by moving the mouse, the content of the clip is played in display section 331 of the time line assistant. The time line assistant displays other information about the clip in display area 333. This information includes the name, duration and media type of the clip. Display area 332 displays the absolute time code of the centerline 31 relative to the programme start. Alternatively, Buttons 334 may be used to select between absolute time code and the clip time code where the clip time code is relative to the start of the source media containing the selected clip. A further alternative mode selected by the buttons 334 causes the time code display 332 to automatically display absolute time code, if the mouse is over the timescale, or clip time code if the mouse is over a clip. The time code display 332 includes an indicator (not shown) which shows the mode of time code display.

Time varying information, for example a transition function or audio waveform cannot easily be displayed in the time line assistant section of the display. Such time varying information relevant to a clip or transition, which is near to the centerline, may be displayed on the time line when the mouse pointer is positioned over the clip or transition. An example of a transition, 39, is shown in FIG. 3. Preferably the region of the time line near to the centerline should be approximately linear with time and should appear straight, that is it should not appear curved near to the centerline. This linearity allows transitions and audio waveforms to be viewed without distortion in the centre of the screen.

The display device, 16, has a finite resolution which will vary according to the particular device selected, but which may be limited to 1024, or possibly 1600, pixels wide. Consequently there is a limit to the detail shown towards the extremities of the time line. Whilst a programme, or part of a programme is playing in window 232, the information on the time surface moves smoothly along the surface with the central portion of the time surface showing the frames which are currently playing. Whilst editing or composing a programme, the operator may wish to alter the central part of the time surface so that current section of interest is taken from another part of the programme. That is, the operator may wish to scroll through the programme. Scrolling is achieved by placing the mouse, 18, over the timescale, 34, pressing and holding the mouse button and dragging left or right. Scrolling may also be achieved using scroll bar 38 or by placing the mouse over any unused track area and dragging.

It will be noted that the information on the time surface is moved relative to the display, and that the current position in the programme is always represented by the centre line of the time surface. In the prior art described, information is displayed in a fixed position whilst a pointer moves across the time line to indicate a current position in the programme. Also, in the prior art described, the whole time bar display area may jump when the pointer attempts to move over the end of the currently displayed portion of the time bar. In this invention, the time bars always move smoothly past the centerline. When a section of the programme moves towards the centerline, the section is gradually expanded so that transitions and effects are shown in more detail, the maximum amount of detail occurring at the centerline.

The ability to move smoothly and continuously along the programme time line is a feature of the invention.

The preceding description of the arrangement of information displayed to the operator reduces the number of items displayed at any one time since only information about one clip is displayed. However, the addition of information, for example duration and media type, which is displayed about a selected clip is more than that available on a time line according to the preceding description of the state of the art. The information is displayed in a fixed format and fixed display position. The arrangement also allows the operator to select the information displayed by the simple operation of moving a mouse over a clip or transition of interest. The reduced amount of information on the time line, the fixed format and position of the time line assistant, the extra information and the easy selection of selected clips or transitions all contribute to an improved operator interface.

The construction of the time line will now be described with reference to FIGS. 4, 5, 6 and 7. The curvature of a timescale will first be described with reference to FIG. 4. The curved timescale is then expanded conceptually to a three dimensional time surface which is projected geometrically onto the plane of the two dimensional display. The three dimensional time surface and projection is described with reference to FIGS. 5 and 6. Finally the dynamic aspects of the time line will be described with reference to FIGS. 7A and 7B.

Figure 4:
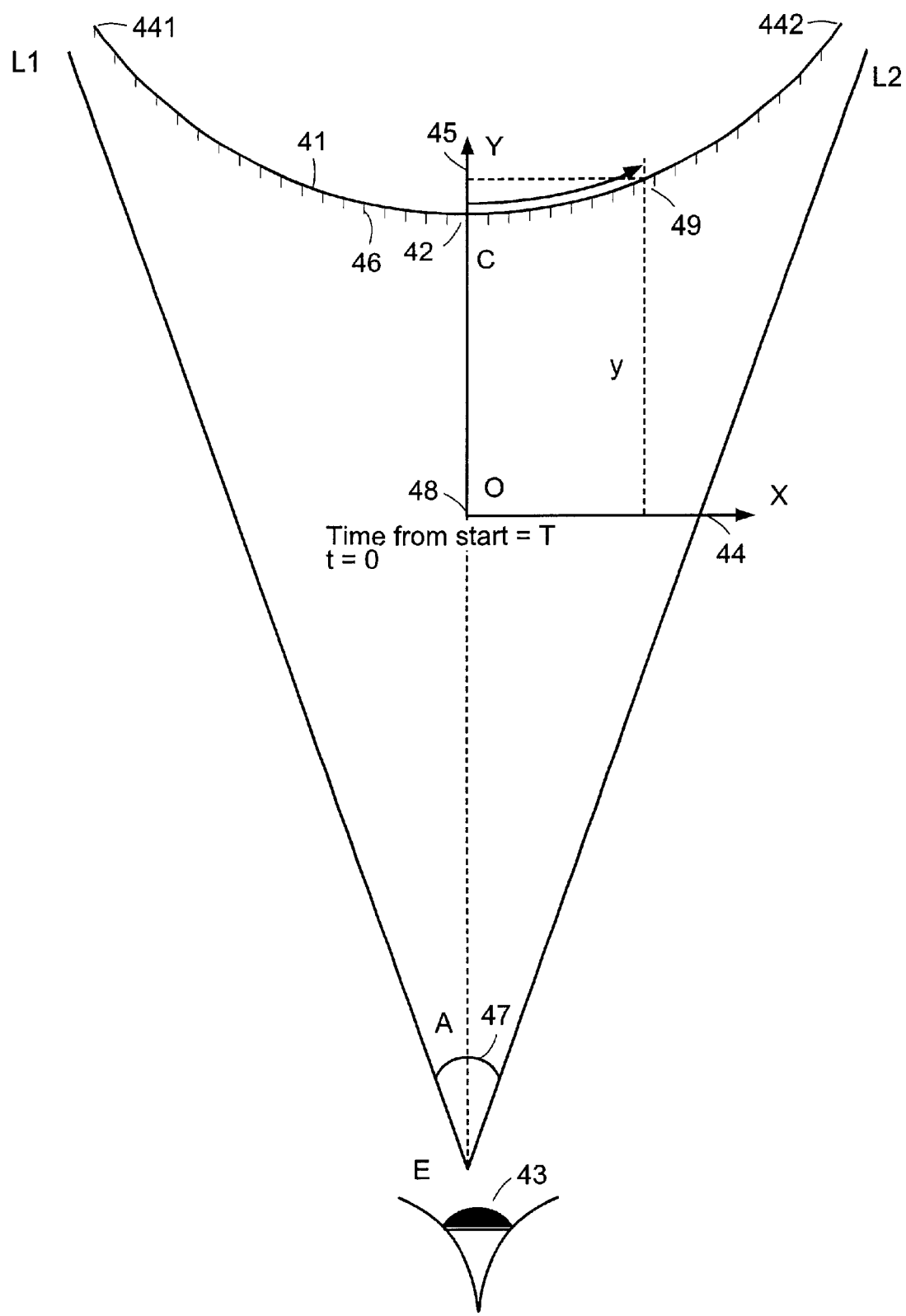
FIG. 4 shows a two dimensional timescale for generating a time line.

The operator requires an overall view of the complete time sequence of the programme at the same time as viewing the detailed frames of a section of current interest. Clearly if the whole time sequence of the programme is displayed linearly so that single frames may be resolved then the time line would be so long that an operator could not see it all at once. FIG. 4 is a view of a timescale, 41, for a time line which is curved so that all of the timescale is within the field of view of an operator from the start of the programme at 441 to the end of the programme at 442.

The Curve of timescale 41, may be mathematically described in terms of X axis, 44, and Y axis, 45, with origin O, 48, as $y=F(x)$. The X Axis would appear as a horizontal line to observer, 43, and the orthogonal Y axis is a centre line of sight of the observer. The observer, 43, will have a useful field of view which is limited to an angle, A, 47, which may typically be about 50 degrees. Lines EL1 and EL2 show the useful field of view of a typical observer.

A point, 49, with co-ordinates x,y referred to origin 0 occurs at time T+t from the start of the programme and also time t from the centre point C. Moving from centre point C towards L1 is equivalent to moving backwards in time and hence the value of t is negative in this region. However, the points with negative values for t represent points at time T−t from the start of the programme and hence t can never be less than −T.

In FIG. 4, time is calibrated linearly along timescale 41 as shown by the tic marks, 46. Because the timescale is bending away from the observer 43, the tic marks appear to the observer to be getting closer together towards the extremities, 441 and 442, of the timescale. The centre section of the timescale shortly before and after the central point C, 42, provides maximum resolution of the timescale to the observer. This central section of the time line is used by the operator for temporally accurate editing and is normally used for the current section of interest of the programme. FIG. 4 shows the section of interest about half way through the programme at a point in the sequence which is time T from the start of the programme. The current section of interest may be of interest because it is the point in a programme which is currently being edited or because it is the current point in a programme which is being played.

The composed programme represented along the timescale, 41, may be of any length but the overall appearance of the time line should not be dependent on programme length. In particular, the scale and appearance of the section of current interest should be independent of the programme length. The section of current interest should also appear to be nearest to the operator and appear symmetrical about the centre line of sight, Y, of the observer. F(x) is chosen to satisfy these requirements which may be expressed as follows:

(1) F(x) is chosen to be asymptotic to L1 and L2 so that an increase in programme length will cause the start and end points, 441 and 442, of the programme to extend towards the asymptotes L1 and L2 without affecting the current area of interest 42.

(2) F(x) is chosen so that F(-x)=F(x) so that the timescale is symmetrical about point centre point C (3) F'(0)=0, denoting that the first differential of F(x) with respect to x is zero when x=0 so that the centre section of interest, 42, is represented along a smooth, symmetrical curve.

(4) F(x) should be approximately linear near to centre point C so that there is no significant distortion of time at the point of current interest.

Mathematical text books show that the distance, t, along the timescale, 41, to any point, 49, whose coordinates are x,y with reference to origin O, is given by:

$$t = \int Sqrt(1+F'(x)^2)dx \qquad \text{(Expression 1)}$$

where $\int$ represents integration from 0 to x where x may be positive or negative.

Sqrt( ) is the square root function

F' (x) represents the first derivative of F(x) with respect to x.

F(x) may be any function which approximately satisfies the four stated requirements and which allows expression 1 to be evaluated. The function used may be a hyperbolic trigonometric function selected from:

$$y = c^* \cos h(x/c) \text{ or}$$

$$y = c^*(\sin h(x/c))^2 + c$$

where c is the distance OC in FIG. 4.

These hyperbolic functions do not satisfy requirement (1) absolutely, but they are close enough in practice in the region of interest and convenient to work with. They satisfy requirements (2), (3) and (4).

Methods of integrating the expression 1 in order to determine x and y in terms of t are well known mathematically for hyperbolic functions. For y=c*cos h(x/c) it can be shown that:

$$y = Sqrt(t^2 + c^2)$$

$$x = c^* \log[(t+y)/c]$$

where log[ ] is the natural logarithm function t may alternatively be expressed in terms of x by the equation:

$$t = c^* \sin h(x/c)$$

An alternative function F(x) that more closely satisfies the requirements (1) to (4) above is the hyperbola represented by the equation $$(y+b)^2/d^2 - x^2/a^2 1$$

where b is the distance EO in FIG. 4, d is the distance EC in FIG. 4 and a is a constant which determines the angle A between the asymptotes. This suffers the disadvantage that Expression 1 above cannot be solved analytically, so t must be determined by numerical integration.

Figure 5:
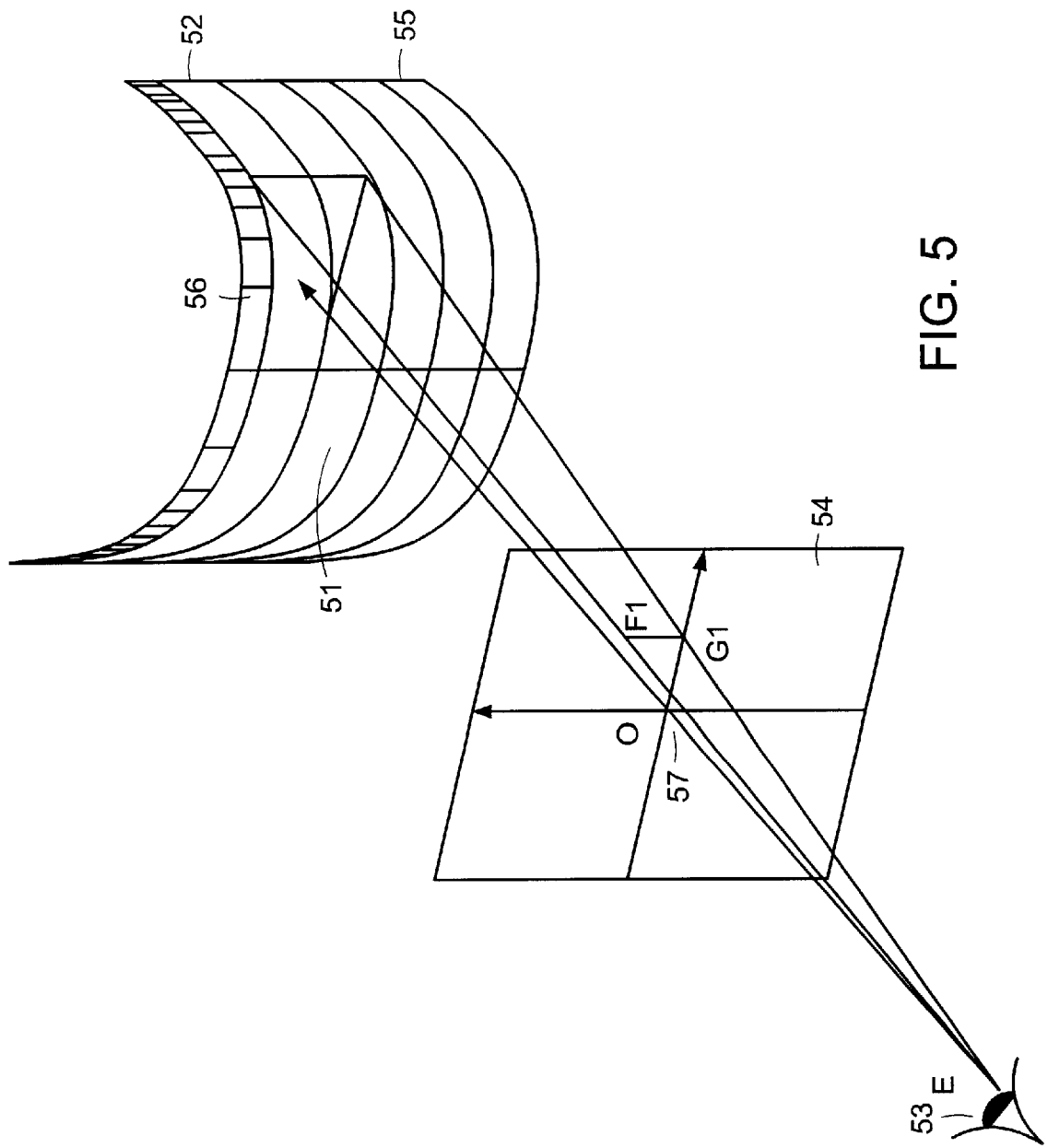
FIG. 5 shows a the projection of a point on a three dimensional time surface onto a two dimensional plane.

FIG. 4 shows a two dimensional representation of time but a time line for use in video editing apparatus has a number of tracks which result in a three dimensional time line. This three dimensional time surface must be displayed on the two dimensional display device, 16, in FIG. 1. FIG. 5 shows how the three dimensional time surface, 51, may be projected on to a two dimensional plane surface, 54. The time surface is described geometrically with reference to orthogonal axes XYZ which intersect at origin O, 57. The axes X and Y correspond to axes XY in FIG. 4 and hence the timescale 56 is constructed as previously described with reference to FIG. 4. Time surface 51 consists of a number of tracks of video or other input, represented by 52, 55 and other tracks shown in between tracks 52 and 55. The tracks are show on time bars which are stacked in the direction of the Z axis.

The following mathematical description shows how to calculate data for displaying three dimensional time surface 51 on a display positioned at plane surface 54. It will be appreciated that the timescale 41 in FIG. 4 and the time surface 51 in FIG. 5 are drawn to assist in the explanation of the invention and do not actually exist in practice. For simplicity plane surface 54, and hence the display, is positioned at origin, O. The following mathematical description could easily be extended to allow calculation of the displayed time line for any position or orientation of the display screen with respect to the Time surface 51.

The display screen co-incident with plane surface 54 is viewed by observer 53 at point E. The observer will be able to see all points on the time surface projected on to the display screen. For clarity, only three points, C, G, F, on the time surface 51 are shown mapped to points O, G1, F1 on the display surface 54. All points are mapped according to the same geometric projection shown in FIG. 5 so that a complete mapping of the time surface is formed on the display surface 54. The three points C, G, F have co-ordinates with respect to origin O defined as (0 Cy 0), (Gx Gy 0), (Fx Fy Fz) respectively. In FIG. 5 Fx=Gx and hence Fy=Gy. H shows the y position of F and G on the y-axis.

It will be noted that F is a general point on the time surface 51.

If the function F(x) is chosen as y=c*Cos h(x/c) then Cy=OC=c

Gx, Gy and Fx, Fy may be found as functions of t as explained earlier.

In FIG. 5 the viewer, 53, is positioned at distance EO from the display surface 54 and is viewing the centre of the surface normally along axis Y. A number of different projection methods for projecting three dimensional objects onto two dimensional surfaces are well known in computer graphics. The perspective method is described.

The co-ordinates of points F1 and G1, which are (F1x F1z) and (G1x G1z) respectively, on the display surface can be calculated by simple geometry of similar triangles:

Point C maps directly to point O, whose co-ordinates are (0 0 0)

Point G lies in the plane of the X axis and hence G1z=0

$G1Gx=Gx*EO/EH$ $EH=EO+OH=EO+Gy$ EO is previously defined as the viewing distance Hence $G1x=Gx*EO/(EO+Gy)$ Point F is a general point on the time line surface 51 and the co-ordinates of F1 may be found as follows:

By similarity with the calculation of G1x:

$F1x=Fx*EO/(EO+Fy)$ $F1z=Fz*EG1/EG=Fz*EO/EH$

Hence $F1z=Fz*EO/(EO+Fy)$

Hence, the projected coordinates, (F1x, F1z), of any point F(xyz) on the time surface may be found.

Figure 6:
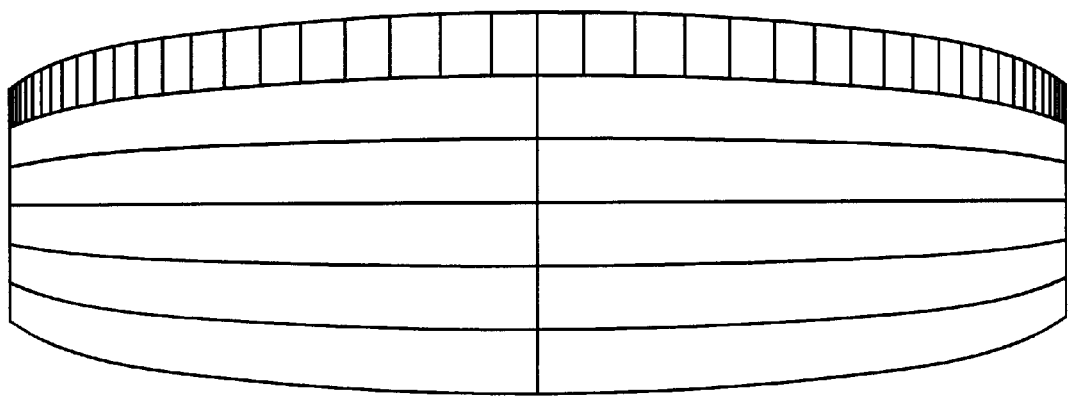
FIG. 6 shows a time surface projected onto a two dimensional plane.

FIG. 6 shows a projection of all points of a time surface onto flat plane for display using this method of projection.

The previous description shows how to calculate a time surface display for viewing the composition of the programme centred on time T. During the editing process the operator will wish to move backwards and forwards through the programme sequence and will drag the time line using the mouse, 18. Moving through the programme sequence is equivalent to changing time, T, from the programme start. It will be appreciated that the shape of the time surface does not change when T is changed. However the information displayed on the surface is changed to represent a perspective view of the whole programme centred on the currently selected time T. Thus any frame, with time code TF, in the programme will be represented on the time surface at a time t=TF−T. Also, when the programme is playing T will change at a constant rate determined by the video standard in use. As the programme is played or as the operator drags the time bars along, T changes and the display is continuously updated with the current information on the time surface.

Figure 7A:
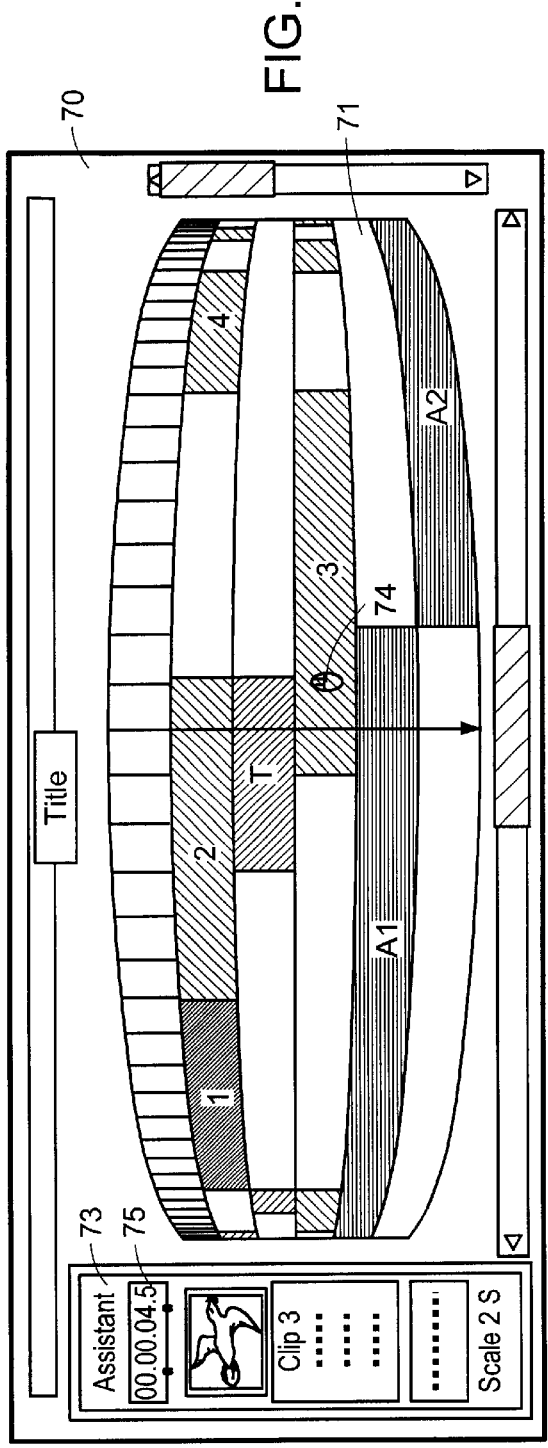
FIGS. 7A and 7B show views, at different times, of a time line according to the current invention.
Figure 7B:
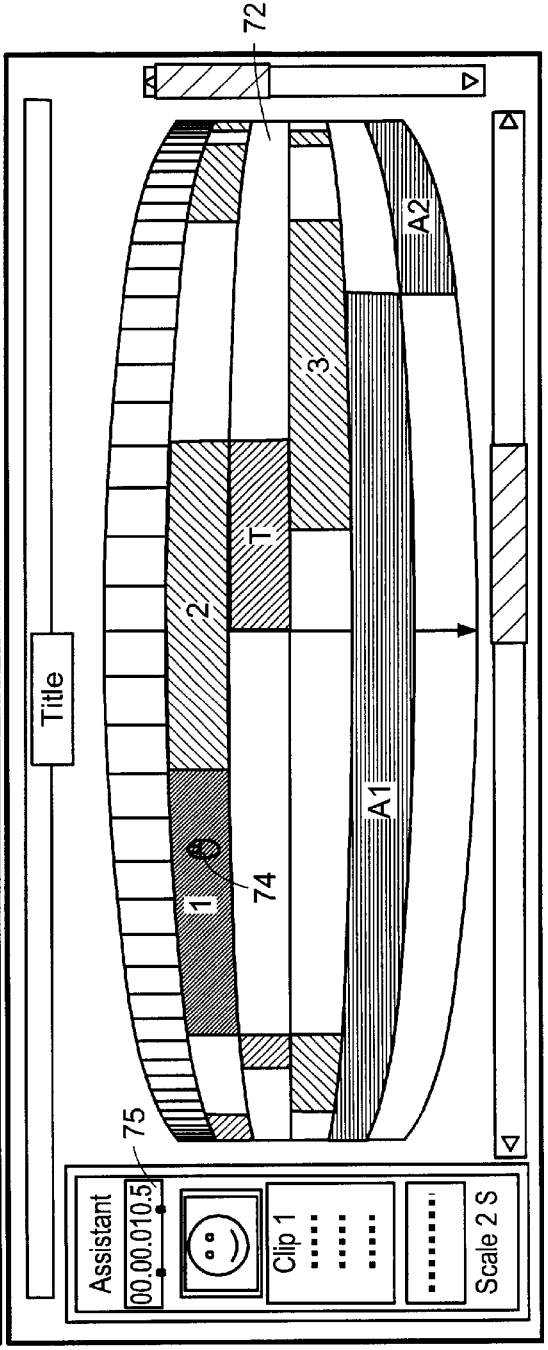

In computer applications for desk top use it is common to provide a preference file, or set of preference files, so that an operator may configure some aspects of the displayed appearance of a computer application program such as colour and font style. FIGS. 3, 7A, and 7B illustrate one appearance of the time surface, projected onto the plane of the display, which forms part of the current invention. The operator may be provided with preference setting controls to alter aspects of the time surface. The aspects which may be varied include the degree of perspective applied, which is controlled by viewing distance OE, and the linearity of the central portion of the surface, which may be controlled by parameter c. The function F(x) may also be varied to further alter the appearance of curvature of the time surface. The preferences are set by an operator using an interface which displays examples of the shape and perspective. The operator selection then allows values of c, OE to be calculated from the chosen F(x). The operator is not aware of the controlling parameters nor any other aspect of the calculations described above. The operator may also suppress clip numbering, 351, or the timescale tics 34. Whichever preferences are set, the total composed programme duration is always shown on the time surface. A slider control 335 is provided to linearly scale the value of t in the preceding calculations causing the scale of timescale 34 to change as indicated by the display 336 which shows the time per tic mark on timescale 34.

Referring to FIGS. 7A and 7B, FIG. 7A shows a view of the time line 70 and time line assistant, 73, at a point where time bars, 71, are about half way through the programme sequence. FIG. 7B shows the time bars, 72, at a later time. The time delay between FIGS. 7A and 7B is shown by way of example as 6 seconds. The time code, 75, displayed in the time line assistant window has changed accordingly. In FIG. 7A, the mouse pointer, 74, is shown over clip 3 and consequently information regarding clip 3 and a frame of clip 3 is displayed in the time line assistant. The operator may move the mouse pointer by moving the mouse. The effect of moving the mouse pointer is shown in FIG. 7B in which the mouse pointer 74 is shown moved to be over clip 1. Consequently clip 1 information and a frame from clip 1 is now displayed in the time line assistant.

From the preceding description it will be seen that the time surface display is continually updated as T is changed, either by scrolling or as the composed programme is played. A brief description of this process is now given.

The process by which an operator builds up a composed programme, by adding clips and effects to a time line, is controlled by the computer software program. It is known common practice for such software programs to build a separate object description for each clip, effect or other item which is added to the time line. The composed video programme is then described by a list of the objects. This list of objects, together with the video, audio or other type of content of each object, is used by the software to produce a single, composed programme on the output media via the output media interface. The process of creating the single composed programme from the source clips and other items is known as rendering. Rendering is also required when the composed program is played by the operator on the display and the list of objects is also used by the software to render the time line.

Using the co-ordinate system defined for FIG. 5, values of t are generated from a series of values of x using a look-up table whose contents are pre-calculated using the relationship derived earlier. The values of x chosen correspond to all addressable points along a horizontal line of the display and the values of x are used as the look-up table address. Values of y are then generated by a further look-up table, whose contents are also pre-calculated using the relationship derived earlier, and whose address is also the values of x. This method provides sets of XY values, which correspond to a series of values of t, in which the amount of processing has been minimised by only processing values for points which may be discretely displayable. (Note that in systems according to the prior art, t is mapped linearly to x, which is a trivial calculation). The complete time surface is then rendered in three dimensions, using co-ordinates xyz and the object descriptions, prior to reduction to two dimensions by the perspective projection method described. The three dimensional rendering process is preferably carried out by the 3D graphics accelerator circuit card 13. If the 3D accelerator circuit card is not included in the system hardware, then the full rendering is carried out by software at a reduced speed.

As previously explained, the operator defines audio or video tracks on time bars of the display and then adds trimmed clips to the tracks. A feature of this invention is the ability to see high temporal detail around a central region of interest. Such temporal detail may involve the precise relationship between two or more clips which are usually shown on different tracks. In order that an operator can work accurately in time using a time line system, it is desirable that all the tracks containing clips which relate to a particular edit which is in progress are displayed adjacently. The adjacent grouping of tracks which is optimum for one edit may not be optimum for the next edit. A means is provided in this invention so that the arrangement of tracks on the display may be changed, automatically by the software programme, so that tracks which contain clips which are temporally adjacent to, or overlap, a selected clip are displayed adjacent to the track containing the selected clip. This function may be invoked by a button, not shown, in the time line assistant display.

It is often necessary, during the composition and editing process, to use more tracks than the number of time bars which are available. Under these circumstances some tracks may be allocated to hidden time bars, not shown, and a means is provided in the time line assistant to create tracks and determine which tracks are displayed. The software program is provide with an intelligent function which determines which tracks are currently most relevant to an operator based on a series of criteria. These criteria include showing tracks which have recently been used or which contain clips close to or adjacent to a currently selected clip. The operator may select tracks as indicated by the software or may chose to allow the software to update the display according to set criteria such as when a new clip is selected or the operator may select tracks according to his own preferences.

In order to reduce the number of hidden tracks, a means is provided to superimpose the information for a group selected group of tracks onto a composite track. Selecting a clip on a superimposed track causes some, or all, of the group of tracks to be displayed normally as determined by the intelligent software function.

Figure 8:
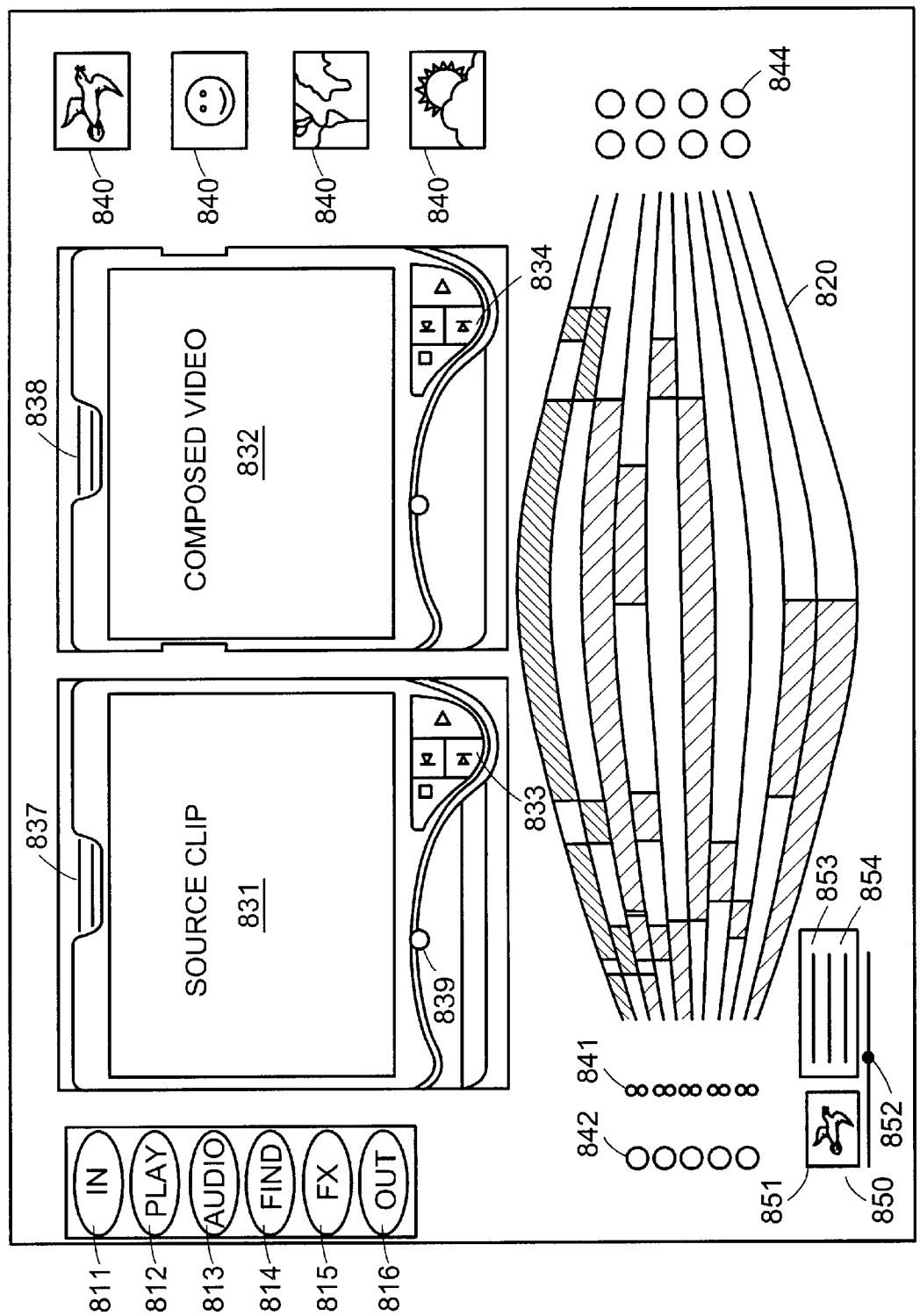
FIG. 8 shows a view of an alternative embodiment of a time line according to the current invention.

FIG. 8 shows an editing screen which is an alternative to the editing screens shown in FIGS. 2 and 7.

The timeline 820 is constructed using a hyperbola and is used in conjunction with time line assistant 850. Buttons 811 to 816 control the mode of the video display windows 831 and 832.

"IN" button 811 allows clips to be imported into the composition system from a source, for example a video tape deck. Single frames of the clips which have been imported and are therefore available for inclusion in the composed sequence are shown in the thumbnail displays 840.

"Play" button 812 allows the video displays 831 and 832 to play the source clips and composed video using controls 833 and 834. Control 839 is a "jog Shuttle" and allows scrubbing through the video clips at a variable rate.

"Audio" button 813 allows audio clips to be imported and edited.

"Find" button 814 allows a track selected on the timeline 820 to be located and displayed in window 831

"Effects" button 815 selects a mode where blending and merging effects may be added to the composed program.

"Out" button 816 is used when a sequence is complete and requires storing on an external medium such as magnetic tape.

Time code displays 837 and 838 show the start, end and current time code of the clip or composed sequence displayed in windows 831 and 832 respectively.

Controls 842 and 844 are used to define the track contents, arrange the order of the tracks, superimpose tracks, and lock selected tracks together so that they may be moved along the timeline or otherwise edited as a single entity. Indicators 841 show which tracks are active and shown as part of the composed program in window 832.

The display area 851 shows the video frame of the clip which is currently under the mouse pointer (not shown). Display 853 shows the time code of the selected source clip or composed sequence.

Slider 852 controls the viewing parameters of the timeline. Moving the slider has the effect of altering the effective viewing distance so that the central portion of the timeline displays at a higher or lower temporal resolution. Moving the slider to the left has the effect of "moving" the timeline away from the viewer so that the central potion is displayed at a lower temporal resolution and moving the slider right increases the temporal resolution.

Thus in its preferred embodiments, the invention provides a video editing system which provides a method of displaying the temporal relationship of data elements, where each data element may consist of one video frame or a succession of video frames or an audio signal which are combined by editing to form a temporal sequence of video and audio data.

A single display represents the temporal position of all, or many, data elements of the combined temporal sequence irrespective of the length in time of the combined temporal sequence. The temporal position and duration of each data element can be indicated by means of a marked area on one of several adjacent displayed time bars which comprise the display, each time bar representing temporal positions in the sequence along its length, where the corresponding points on each of the time bars represent identical time from the start of the combined temporal sequence.

The display thus has a spatio-temporal relationship which varies according to position along a time bar, so that a portion of the combined temporal sequence may be displayed in high temporal resolution, and that portion may be selected by scrolling the display.

The display may be scrolled either in synchronism with the movement of a computer input device or synchronously with a reproduction of the combined temporal sequence, continuously and smoothly from any point in the combined temporal sequence to any other point in the combined temporal sequence, including the starting or ending point of the combined temporal sequence.

The display may represent a perspective view of a three dimensional time surface consisting of adjacent bars which curve away from the viewpoint of an observer, about an axis perpendicular both to the time axis of the display and to a line from the viewpoint of the observer to the centre of the display. Time is represented linearly along this surface in the direction of maximum curvature. As explained above, the curvature of this time surface is preferably defined by a hyperbolic function.

The temporal resolution preferably increases continuously from the starting and ending points of the combined video sequence towards the centre of the display so that the temporal resolution is a maximum at the centre of the display which is at a point indicated by a centre line shown on the display.

The contribution by one or more data elements to at least part of the combined temporal sequence may be controlled by a continuously varying signal.

The display may consist of more than one section, namely a first display section as described above, in which temporally varying information is displayed, and a second display section showing information about a selected data element of the first display.

Such information could be a time value relative to the start of the data element or relative to the start of the combined temporal sequence. In addition, the second display section could display a frame of the selected data element, where the selected data element is selected by the position of a computer input device in the first display area.

The time bars may be placed in an order on the display by a computer program in such a way that data elements which temporally precede, follow or overlap a selected data element are displayed on time bars which are spatially adjacent to the time bars on which the selected data element is displayed.

The number of separate time bars displayed may be reduced by selecting time bars which do not contain data elements in the region of high temporal resolution, and displaying a composite time bar formed by the superposition of the data elements of the selected separate time bars.

There may be one or more composite time bars, formed from one or more selections of separate time bars, and a separate time bar may be included in more than one selection. The selection may be performed either by a user or by a computer program. This superposition process can be either temporarily or permanently inhibited by the user.

What is claimed is:

1. A system for editing together media segments using data processing means, in which a visual representation of a time line is provided and a plurality of elements representative of the media segments are arranged on the time line, and in which the time line comprises a primary region in which the displayed linear extent per unit time is a maximum, and secondary regions to either side of the primary region in which the displayed linear extent per unit time is less than in the primary region, and wherein an element in a secondary region can be moved into the primary region.

2. A system as claimed in claim 1, wherein the displayed linear extent per unit time gradually decreases outwards from the primary region.

3. A system as claimed in claim 1, in which an element can be smoothly scrolled along the time line.

4. A system as claimed in claim 1, wherein the visual representation is provided with a perspective effect seeming to curve away from a viewer.

5. A system as claimed in claim 4, wherein the height of the visual representation decreases from the primary region outwards.

6. A system as claimed in claim 1, further comprising a supplementary display of information relating to a media segment which is represented by an element, which is activated when the element is selected.

7. A system as claimed in claim 6, wherein selection of an element for the purpose of the supplementary display can take place at any point along the timeline.

8. A system as claimed in claim 6, wherein selection of an element for the purpose of the supplementary display is effected by placing a pointer over the element.

9. A system for displaying the temporal relationship of data elements in a media editing system, in which there is provided a visual display representing the temporal position of a plurality of data elements of a temporal sequence, and wherein the data elements are displayed with a higher temporal resolution in a central portion of the display than at the start and end points of the display, so that a selected part of the temporal sequence may be displayed in high temporal resolution in said central portion.

10. A system as claimed in claim 9 wherein the display can be scrolled in order to select the part of the temporal sequence which is displayed with high temporal resolution.

11. A system as claimed in claim 9 wherein the temporal resolution increases continuously from the start and end of the sequence towards the centre of the display, so that the temporal resolution is at a maximum at the centre of the display.

12. A system as claimed in claim 9 wherein the display further comprises one or more adjacent time bars, each time bar representing temporal positions in the sequence along its length, where the corresponding points on each of the time bars represent identical time from the start of the combined temporal sequence, and wherein the temporal position and duration of each data element is indicated by means of a marked area on one of the time bars.

13. A system as claimed in claim 9 wherein the display represents a perspective view of a three dimensional surface which curves away from the viewpoint of the observer about an axis which is perpendicular both to the time axis of the display and to a line from the viewpoint of the observer to the centre of the display, and in which time is represented linearly along the direction of maximum curvature of the surface.

14. A system as claimed in claim 13 wherein the curvature of the surface is defined by a function which is asymptotic towards the lines defining the edge of the field of view of the observer.

15. A system as claimed in claim 14 wherein the curvature of the surface is defined by a hyperbola.

16. A system as claimed in claim 13 wherein the curvature of the surface is defined by a hyperbolic function.

17. A system as claimed in claim 13 wherein the curvature of the surface is defined by a parabola.

18. A system for editing together a plurality of media segments using data processing means, in which a visually represented time line is displayed to a user on a display device, the time line comprising a plurality of visually displayed, distinct elements each of which represents a corresponding plurality of one of the media segments, the elements arranged in series along the time line with the displayed linear extent of each of the plurality of elements dependent on the time duration of the corresponding media segment it represents, wherein:

a) the visual representation of the time line comprises a primary region and secondary regions to either side of the primary region in a linear direction;

b) the displayed linear extent of an element is also dependent on whether the element is displayed in the primary region or a secondary region, the displayed linear extent per unit time being a maximum value in the primary region and less than the maximum value in the secondary regions; and c) wherein an element in a secondary region can be moved along the time line into the primary region such that the displayed linear extent of the element is greater in the primary region than in the secondary region.

* * * * *